(12) United States Patent
Anandan et al.

(10) Patent No.: US 8,459,855 B2
(45) Date of Patent: Jun. 11, 2013

(54) UV LED BASED COLOR PIXEL BACKLIGHT INCORPORATING QUANTUM DOTS FOR INCREASING COLOR GAMUT OF LCD

(76) Inventors: Munisamy Anandan, Austin, TX (US); Aris K Silzars, Sammamish, WA (US)

(*) Notice: Subject to any disclaimer, the term of this patent is extended or adjusted under 35 U.S.C. 154(b) by 177 days.

(21) Appl. No.: 13/065,697

(22) Filed: Mar. 28, 2011

(65) Prior Publication Data

US 2011/0176328 A1   Jul. 21, 2011

Related U.S. Application Data

(63) Continuation-in-part of application No. 12/220,736, filed on Jul. 28, 2008, now Pat. No. 7,934,862.

(51) Int. Cl.
*F21V 7/04* (2006.01)

(52) U.S. Cl.
USPC ............. 362/606; 362/84; 362/231; 362/612; 362/613

(58) Field of Classification Search
USPC .................. 362/606, 612, 613, 616, 617, 619, 362/84, 231
See application file for complete search history.

(56) References Cited

U.S. PATENT DOCUMENTS

| | | | |
|---|---|---|---|
| 5,396,406 A * | 3/1995 | Ketchpel | 362/27 |
| 6,637,905 B1 * | 10/2003 | Ng et al. | 362/601 |
| 7,423,296 B2 * | 9/2008 | Chua | 257/98 |
| 7,888,700 B2 | 2/2011 | Kahen | |
| 7,910,400 B2 | 3/2011 | Kwon et al. | |
| 2005/0057145 A1 * | 3/2005 | Shieh et al. | 313/503 |
| 2005/0194604 A1 * | 9/2005 | Sakuma et al. | 257/98 |

* cited by examiner

*Primary Examiner* — John A Ward

(57) ABSTRACT

A ultra-violet based color pixel backlight system for color filter-less Liquid Crystal Display, comprising multiplicity of LEDs, emitting UV or NUV light in the wavelength range of 150 nm to 390 nm, assembled at one edge of a UV transmitting light guide, which has other three edges and bottom surface coated with UV reflecting layer and its top surface roughened with UV and NUV extracting pixel patterns that contain layers of quantum dots that emit different colors of light in red, blue and green region with sharp spectrum, to increase the color gamut on LCD screen, upon excitation by UV or NUV light. The formed pixels contain reflective islands, underneath the layers of quantum dots, to reflect the visible rays, generated by the pixelated quantum dots, towards the LCD and suppress the visible light leaving the pixel as well as suppress the visible light from adjacent pixels entering the pixel. Thus suppressing the color mixing that could occur without the incorporation of reflective islands. LCD without color filters, a micro-lens sheet and the light guide with color pixels are placed in substantial alignment to provide a color pixel backlight system for LCD. Thus red, blue and green pixels of light from the light guide passes through the intended red, blue and green pixels of the color filter-less LCD, resulting in color pixel backlighting that enhances the optical efficiency of LCD as well as the color gamut on LCD screen.

22 Claims, 13 Drawing Sheets

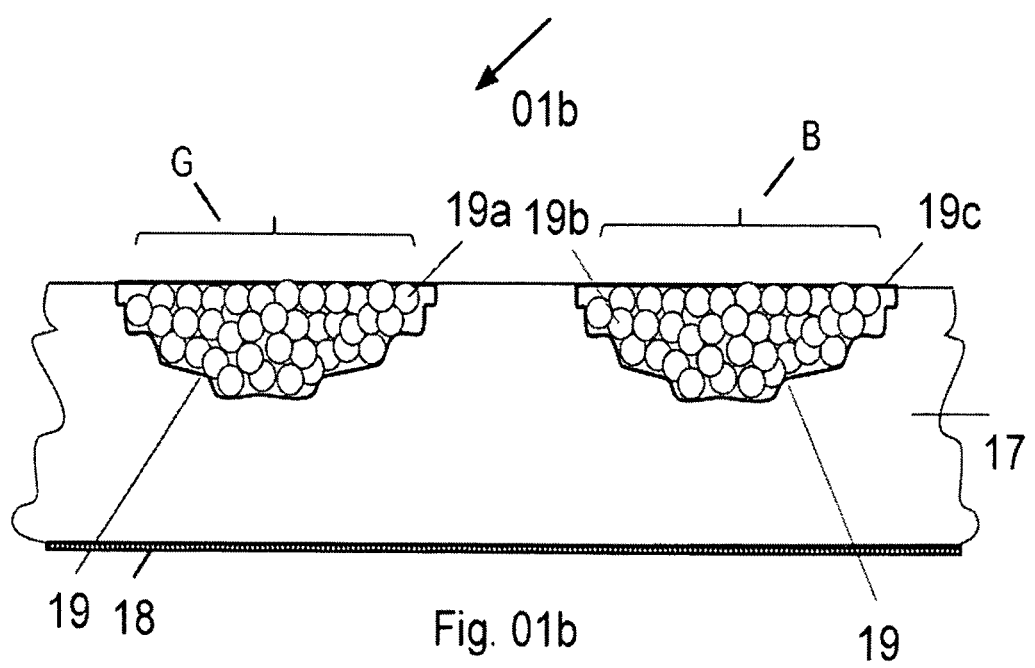

UV LED BASED COLOR PIXEL BACKLIGHT INCORPORATING QUANTUM DOTS FOR INCREASING COLOR GAMUT OF LCD

BACKGROUND OF THE INVENTION

1. Field of Invention

This invention belongs to the area of flat panel display and more specifically to the backlight technology for Liquid Crystal Display (LCD). This invention is 'continuation in part' of the invention on 'UV based color pixel backlight for Liquid Crystal Display', application Ser. No. 12/220,736 (Publication # US-2009-008215-A1) filed on Jul. 28, 2008 by the inventor Munisamy Anandan.

LCD does not emit light and hence requires a backlight for its function as a visual display. Backlights based on Cold Cathode Fluorescent lamps (CCFLs) have been employed for backlighting LCDs. Recently Light Emitting Diodes (LEDs) have been employed as light sources for backlighting LCDs. White LEDs are predominantly used in cell phones and digital cameras and recently in lap top computers for backlighting LCDs. Red, Blue and Green LEDs are used in backlighting LCD TV. LCD requires a flat or sheet source of light at its rear side. As LEDs are point sources of light, there is a need to convert the point source of light into a sheet source of light. This conversion is done through two configurations namely, edge-lit configuration and direct-lit configuration. In an edge-lit configuration, the LEDs are assembled at the edges of a rectangular light guide, usually a polycarbonate slab, and the light from LEDs undergo total internal reflections at the inner surface of light guide and finally get extracted through top surface of light guide facing the back surface of LCD. In the direct-lit configuration, LEDs are assembled inside a box and a diffuser sheet is assembled over the LEDs. Light from LEDs get mixed inside the box and further mixed in the diffuser sheet and finally emanates from the diffuser sheet towards LCD.

Thus a sheet source of light, usually white light, is generated and provided as backlight for LCD. The white light from LEDs contains all three primary colors and the colors are further filtered by color filters incorporated inside LCD for generating good quality of color pictures. It is well known that the color filters absorb 70-80% of incoming light and hence the LCD becomes optically less efficient. This still remains a challenge for the LCD industry.

2. Description of Prior Art

Prior art deals with the elimination of color filters inside LCD and provision of three primary colors of good purity that requires no filtering by the color filters. For example in one prior art (U.S. Pat. No. 4,978,888), Anandan et. al describes the use of flat fluorescent lamp incorporating red, blue and green color phosphors in the form of pixels, for backlighting color filter-less LCD. Red, blue and green color light from the pixilated surface of the flat fluorescent lamp provides individual primary colors of light to the pixels of LCD that does not incorporate color filters. Hence the use of the term 'color pixel backlighting'. The drawback in this prior art is the high ignition voltage in the range of thousands of volts and running voltage in the range of hundreds of volts in addition to thick and massive glass plates employed for the flat light source.

In another prior art (M. J. J. Jack et. al—"Color Separating backlight for improved LCD efficiency", pp. 175-178, Proceedings of 27th International Display Research Conference, 18-20 Sep. 2007, Moscow, Russia; Yoichi Taira et. al, "Low power LCD using a novel optical system", *SID-02 Digest*, pp. 1313-1315, 2002; Jyrki Kimmel et. al, "Diffractive backlight grating array for mobile displays", Proceedings of IDRC 2007, pp. 171-174, Moscow, September 2007) the authors describe the use of diffraction grating over the light guide to separate the three primary colors from the white light and employ a sheet of micro-lenses. The diffraction grating-separated three primary colors go through the LCD that has no color filters. The drawback in this prior art is the 'color crosstalk'. That is, light of one color passes through the unintended pixel of LCD where a different colored light is incident. It is clear from the prior art that providing a simple solution for 'color pixel backlighting' for a color filter-less LCD is a challenge.

In yet another prior art (U.S. Pat. No. 7,036,946 B1) Donald E. Mosier describes LCD backlight employing UV LEDs. In this invention, UV light from LEDs is coupled to a light guide and the UV light is made to fall on phosphor coated on the surface of light guide to emit visible light towards the LCD. This invention is completely devoid of the concept of 'color pixel backlighting' and does not deal with LCD without color filters.

A lower wavelength of light when incident on materials like phosphor results in the generation of higher wavelength of light. This is a basic science and known phenomena that is employed in fluorescent lamp for the past 40 years. Another example of lower wavelength light exciting a phosphor is the blue light from LED exciting yellow phosphor coated on the LED chip. This is commonly found in all the white LEDs employed in cell phone backlighting. This basic science is well known. What is not obvious is the innovative ways in which this basic science is exploited to invent new devices. U.S. Pat. No. 7,036,946 B1 by Donald E. Mosier exploits this basic science in inventing a light guide using UV light from LEDs. This invention does not contemplate about the backlighting of color filter-less LCD through the concept of 'color pixel backlighting'. By reading U.S. Pat. No. 7,036,946 B1, it will not be obvious to a person of ordinary skill to envision the concept of color pixel backlighting and exploit the basic science of lower wavelength light exciting a phosphor to invent a light guide that can backlight a color filter-less LCD. The present invention described in the subsequent paragraphs will not fall under the category of 'obviousness'.

In a research paper (N. Ogawa et. al—"Filed sequential color, LCD using organic EL backlighting"—SID Digest of Technical Papers SID International Symposium 1999), N. Ogawa et. al describe organic based electroluminescent backlight that is backlighting an LCD without color filters. This art is based on the field sequential operation of LCD wherein each frame of LCD driving consists of only one color. For example the backlight will provide a sheet of red light to the LCD 60 times per second and the LCD will select red pixels during this period. The next will be green sheet of light from backlight for 60 times a second followed by blue sheet of light. In other words the backlight will provide continuous sheet of light with a frame rate of 60 Hz for each color. This takes place sequentially for each color during which time the desired color pixels will be selected on LCD to generate color images. In this art, there is no 'color pixel backlighting' that takes place continuously. This is totally a different mode of operation and the sequential flashing of color sheet of light on LCD results in Psycho-physical effect that makes display exhibit 'color break-up', a defect that is still to be solved to make any commercial product.

In all the foregoing inventions, it is clear that either the concept of 'color pixel backlighting' is absent or, if present, it has problems for practical implementation and thus there is no simple solution for the challenge posed by 'color pixel backlighting' of color filter-less LCD. The prior art is well described with the help of several illustrations in the parent invention.

The parent invention, on 'UV based color pixel backlight for Liquid Crystal Display' (Munisamy Anandan—"UV based color pixel backlight for Liquid Crystal Display"—US-2009-008215-A1, application Ser. No. 12/220,736, filed on Jul. 28, 2008) provides a simple solution to the challenge posed by 'color pixel backlighting'. But the parent invention requires an improvement to obtain high color quality of images on LCD screen. The present invention describes this improvement in detail.

BRIEF SUMMARY OF THE INVENTION

According to the present invention, a backlight incorporating a planar UV and NUV light guide employing UV LEDs or near UV (NUV) LEDs as light sources is described. This unique and innovative light guide provides pixelated three primary colors of lights for backlighting LCD that has no color filters. Both edge-lit and direct-lit light guides are described. The UV or NUV light is injected into the UV and NUV light guide and the UV or NUV undergoes total internal reflections inside the light guide. The UV or NUV light is extracted through extracting features etched on the surface of light guide that faces the LCD. The UV or NUV extraction features are coated with a thin porous layer of Aluminum over which is coated a layer of red-light emitting quantum dots in a red pixel, blue-light emitting quantum dots in blue pixel and green-light emitting quantum dots in green pixel. When the extracted UV or NUV falls on the quantum dots, corresponding colors of light is generated. The uniqueness of the quantum dots is the sharp spectrum emitted by quantum dots and the wavelength of the emitted light is dependent on the size of the quantum dot. The sharper the spectrum the better is the color quality and hence better is the quality of color pictures on the LCD screen that obtains its backlight from quantum dots. The etched features or pattern can be in the form of pixels or stripes. When the light guide is aligned to LCD with its etched features and a coupling micro-lens sheet in between, the pixels of LCD are backlit or illuminated with individual colored lights. Red light from etched pattern of the light guide will fall on the pixel of LCD that is intended to generate red pixels for the image. A similar phenomenon takes place for blue and green colors of light. Thus the color filter-less LCD obtains its intended colored backlight in the form of color pixels of light. As the quantum dots emit sharp spectrum compared to the traditional phosphors employed in fluorescent lamps, the color gamut of LCD that is back-lit by the pixelated backlight of the present invention is enhanced and thus results in superior quality of color images on LCD screen.

It is an object of this invention to provide color pixel backlighting for a color filter-less LCD using planar UV or NUV light guide that accepts and converts UV or NUV light into visible light, to enable the LCD to have high optical efficiency.

A further object of this invention is to provide visible color pixel backlighting for a color filter-less LCD through a planar UV and NUV light guide whose edges are assembled with UV or near UV LEDs that inject UV or NUV light into the light guide in the edge-lit configuration.

Yet another object of this invention is to provide color pixel backlighting for a color filter-less LCD through a planar UV and NUV light guide in the form of a box which contains UV or near UV LEDs assembled in the direct-lit configuration.

Yet another object of this invention is to provide pixelated or striped visible color backlighting for LCD through a planar UV and NUV light guide.

Yet another object of this invention is to provide pixelated or striped visible color backlighting for LCD through a planar UV and NUV light guide to obtain high color gamut on LCD screen through the incorporation of quantum dots inside each pixel that is excited by the UV or NUV radiation.

BRIEF DESCRIPTION OF DRAWINGS

FIG. 01b is a cross-sectional view of two adjacent pixels taken from FIG. 01a.

FIG. 08b shows the cross-sectional view of one pixel taken across 8B-8B from FIG. 08a.

FIG. 09 shows the cross-sectional view of the structure of the color pixelated backlight, according to the present invention, assembled in edge-lit mode behind an LCD with a sheet of micro-lens in between.

FIG. 10 shows the cross-sectional view of the structure of the color pixelated backlight, according to the present invention, assembled in direct-lit mode behind an LCD with a sheet of micro-lens in between.

DETAILED DESCRIPTION OF DRAWINGS

Figure 1A:
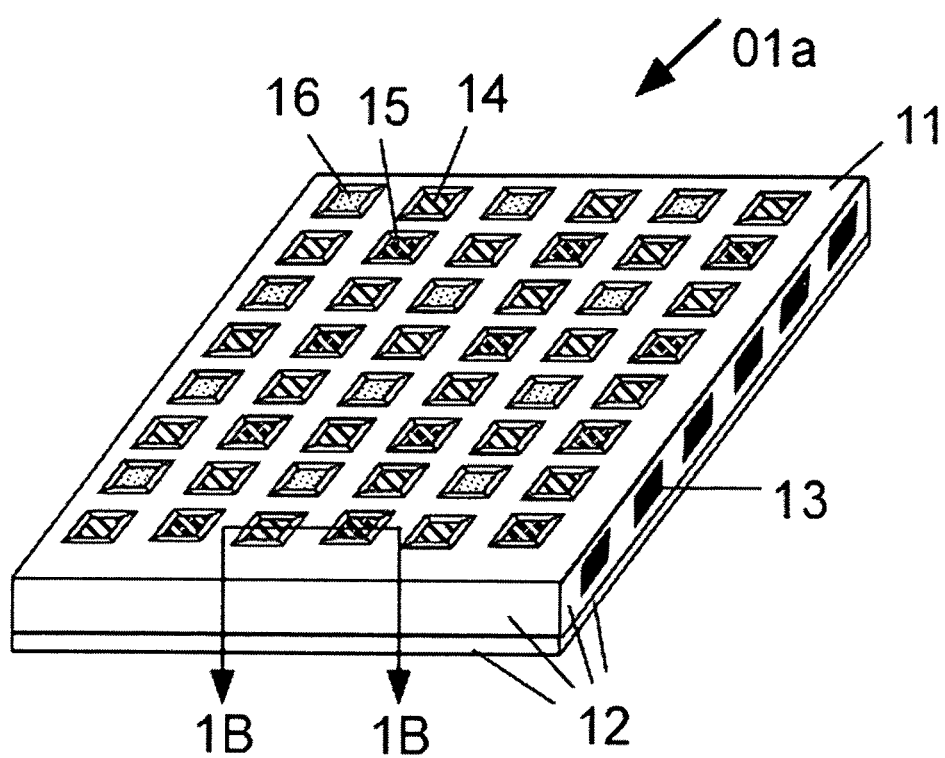
FIG. 01a is an isometric view of the color pixel backlight that incorporates UV or Near UV LEDs assembled at the edge of the light guide according to the parent invention.

FIG. 01a is an isometric view of the color pixel backlight that incorporates UV or Near UV LEDs assembled at the edge of the light guide according to the parent invention (Munisamy Anandan—"UV based color pixel backlight for Liquid Crystal Display"—US-2009-008215-A1, application Ser. No. 12/220,736, filed on Jul. 28, 2008). The light guide 11, which is transmissive to UV or Near UV (NUV) light, has UV or NUV reflecting mirrors 12 made of material like Aluminum and is coated on all three edges except the portions on the edge where NUV or UV LEDs 13 are assembled adjacent to each other. The LEDs 13 are packaged inside a UV and NUV reflecting mirror (not shown in FIG. 01a) and the whole edge is covered with additional UV and NUV reflecting mirror, not shown in FIG. 01a. All other three edges of the light guide and the broad bottom surface are coated with UV and NUV reflecting mirror 12. The UV reflecting mirror is also NUV reflecting mirror and visible light reflecting mirror and is true in all the descriptions that follow. To obtain increased brightness of visible light from the phosphors, NUV LEDs can also be assembled on two edges or three edges or on all four edges of light guide provided all the edges where the UV or NUV LEDs are assembled transmit UV or NUV rays. The UV or NUV rays emitted by the LEDs travel into the light guide and undergo total internal reflections on the broad faces of the light guide. However the UV or NUV rays are extracted at the regions where the light guide is etched or roughened to form pixels. The UV or NUV rays are not shown in FIG. 01a but better shown in FIG. 09. FIG. 01a also shows red phosphor pixel 16, blue phosphor pixel 15 and green phosphor pixel 14. The phosphor layers are deposited by the method of screen printing or ink-jet printing or spin coating followed by lithography over a roughened surface. The details of the pixels are better shown in FIG. 01b along the cross-section taken across 1B-1B.

FIG. 01b is the cross-sectional view taken across 1B-1B of FIG. 01a. The rectangular slab of UV or NUV transmissive light guide 17 has a NUV and UV reflective coating 18 at the wide bottom surface. At the top surface the light guide 17 contains a green pixel G and Blue pixel B adjacent to each other. The phosphor pixel site G and B have etched surface 19, which is coated with green light emitting phosphor 19a at the green pixel site G, to emit green light if the NUV or UV rays fall on 19a. Similarly the etched surface 19 at the blue pixel site B is coated with phosphor 19b to emit blue light if the NUV or UV rays fall on 19b. The phosphor layers are protected at the top surface above the etched surface by a protective layer 19c to protect the phosphor from moisture, oxygen or other contaminants.

Figure 2:
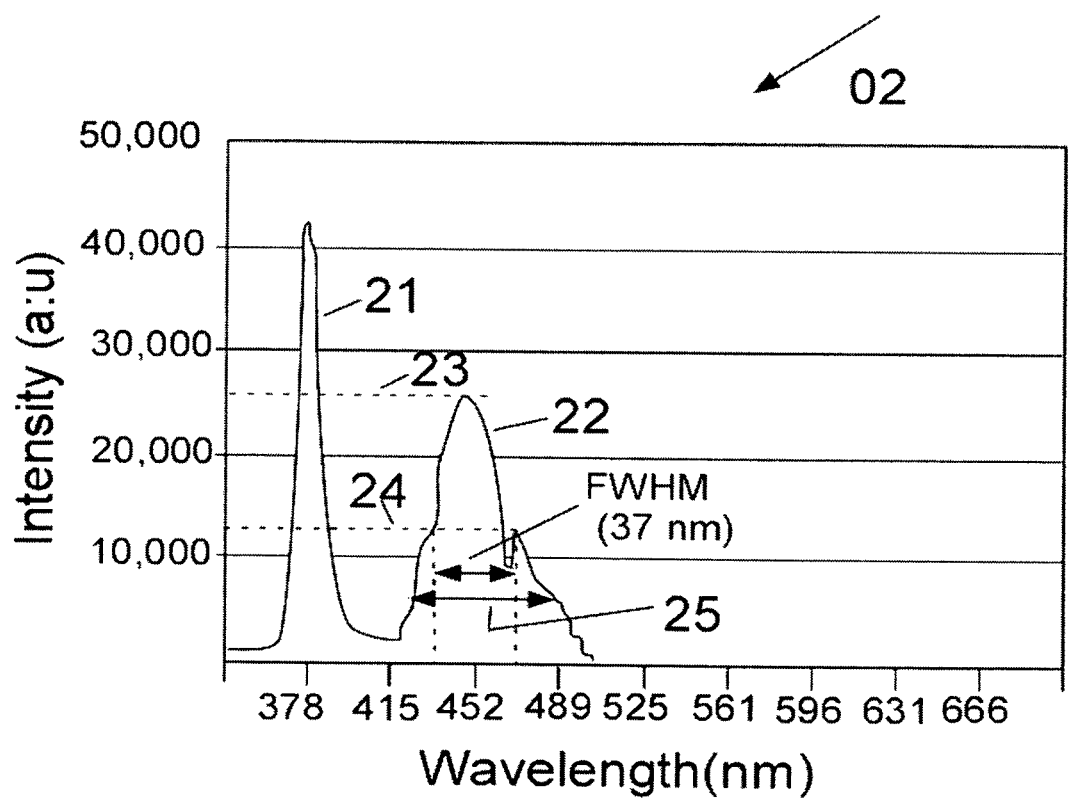
FIG. 02 is the spectrum emitted by the blue phosphor when excited by NUV radiation

FIG. 02 is the spectrum emitted by Eu activated halophosphate blue phosphor under excitation by NUV radiation. The NUV excitation spectrum 21 is shown to have a peak wavelength of 378 nm. As a result of this excitation, the blue phosphor emits a spectrum 22 with peak intensity level 23 and half the value of the peak is shown at level 24. The wavelength spread at half the peak level is called 'full width at half maximum' (FWHM). In FIG. 02 the value is shown as 37 nm. Below half the peak level the spectrum is broadening, suggesting the spectrum is not pure blue and instead it is tending to be bluish-green. The wider nature is indicated by the width 25.

Figure 3:
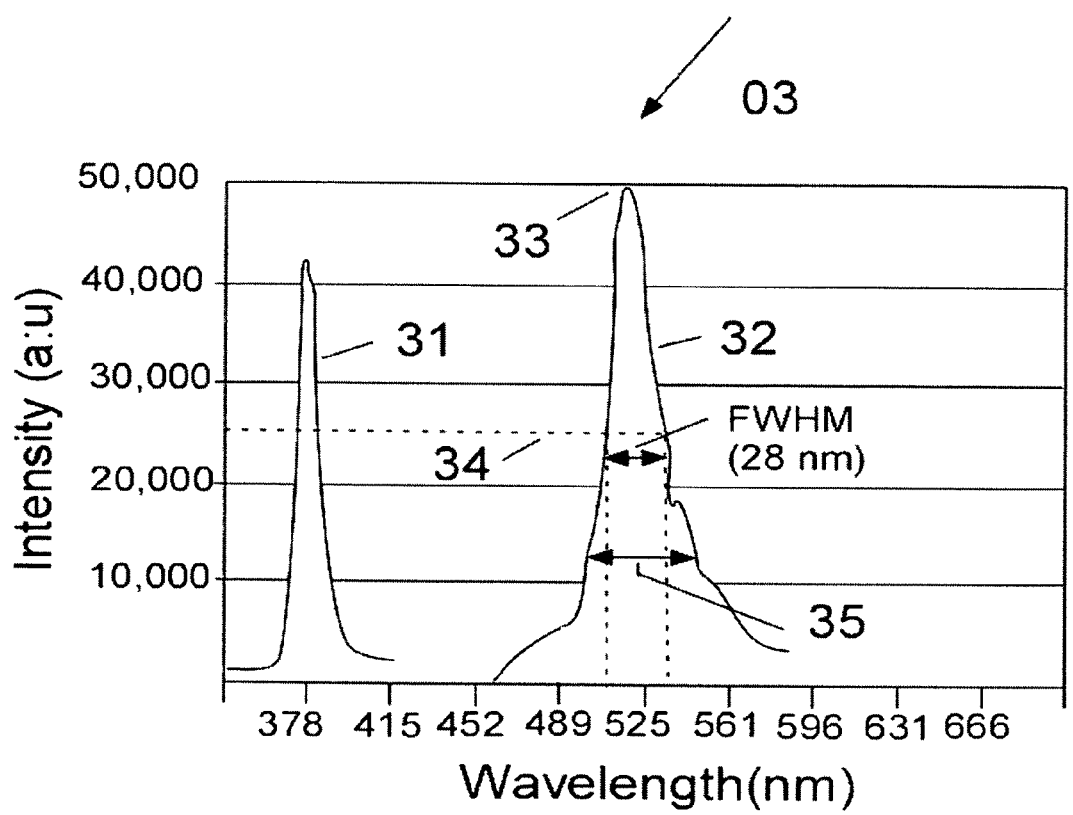
FIG. 03 is the spectrum emitted by green phosphor when excited by the NUV radiation.

FIG. 03 is the spectrum emitted by green phosphor with Eu:Mn activated alakline earth aluminate. The NUV excitation spectrum 31 is shown on the left of the green emission spectrum 32. The peak intensity level 33 and the half peak intensity level 34 are shown. Although the FWHM is 28 nm the spectrum is wide immediately below the half peak level as shown by 35. This spectrum is not pure green and spreads into the wavelength towards red and blue.

Figure 4:
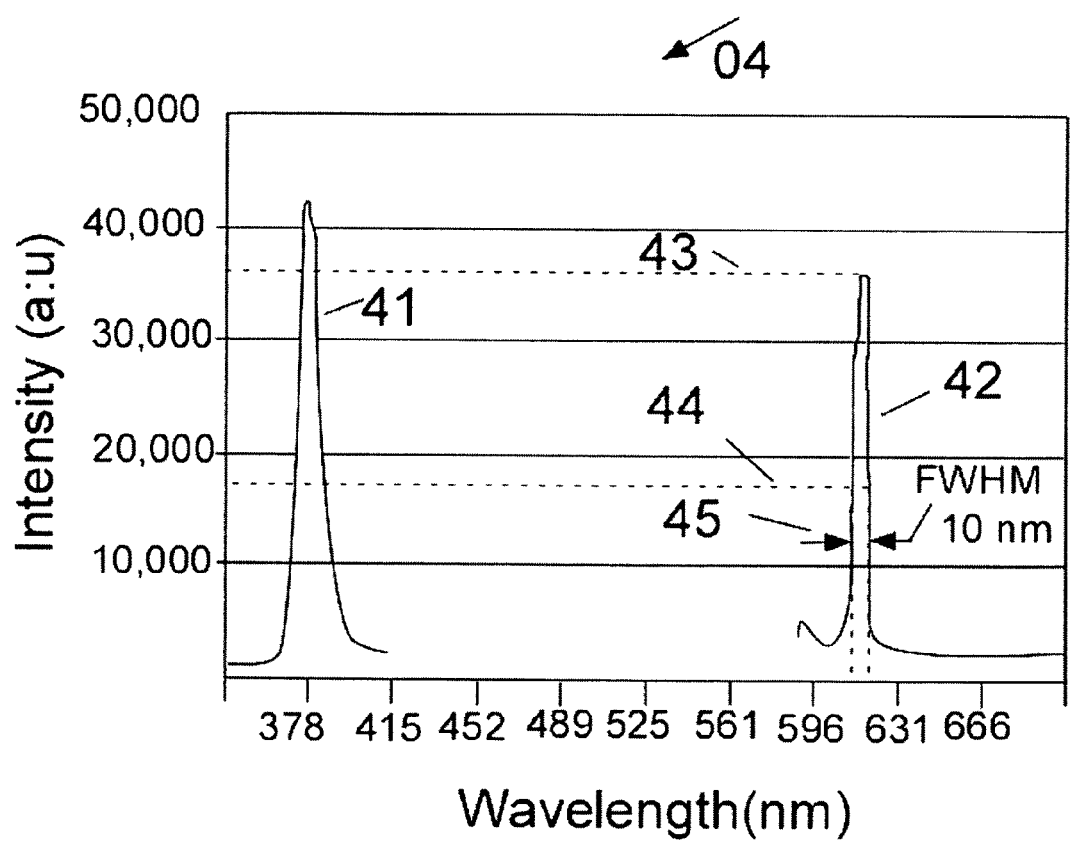
FIG. 04 is the spectrum emitted by red phosphor when excited by NUV radiation.

FIG. 04 is the spectrum emitted by red phosphor with Eu activated tungstate. The NUV excitation spectrum 41 is shown on the left side of the red emission spectrum 42. The peak intensity level 43 and the half peak intensity level 44 are shown. The FWHM is 10 nm. This spectrum is pure red and hence there is not problem for color purity so far as the red is concerned. But its intensity is low. Further the overall quality of color images on the LCD screen is dependent on all the three primary colors.

Figure 5:
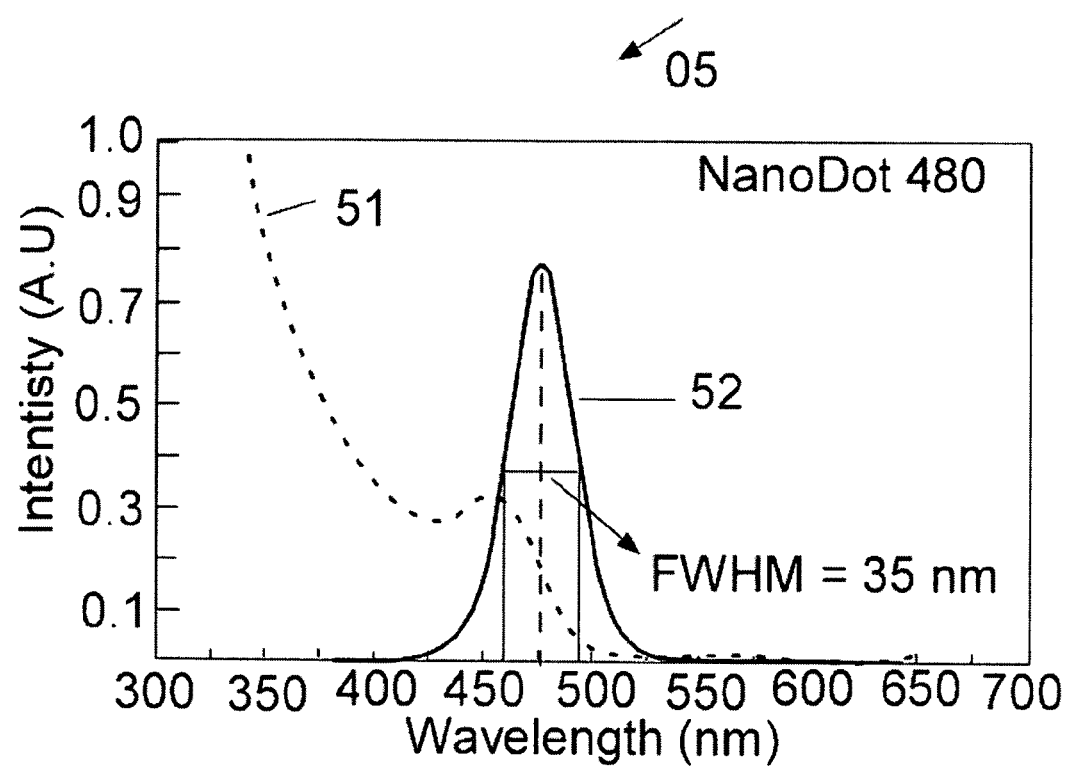
FIG. 05 shows the spectrum of blue light emitted by quantum dots with brand name NanoDot 480.

FIG. 05 shows the spectrum of blue light emitted by quantum dot with the following specification shown in Table I:

TABLE I

Specification of quantum dot emitting blue light under NUV excitation

| Color | Blue |
|---|---|
| Material of quantum dot | CdSe—ZnS |
| Absorption max (+/−5 nm) | 460 |

TABLE I-continued

Specification of quantum dot emitting blue light under NUV excitation

| Emission max (+/−5 nm) | 480 |
|---|---|
| FWHM (nm) | <40 |
| Solvent | Toluene |
| Quantum Yield | 30-50% |
| Particle Size (nm) | 2.5 |

As per the Table I, the blue light emitting quantum dot called NanoDot 480, supplied by the company Sigma-Aldrich, has a diameter of 2.5 nm and has a core material of CdSe with the shell material as ZnS. Every quantum dot is surrounded by a shell to prevent agglomeration of quantum dots and oxidation of the core material. In the conventional designation of dots, it is always written as CdSe/ZnS. This means the core material is CdSe and the shell material is ZnS. Some examples of the materials used for making quantum dots are: CdSe/CdS, CdSe/ZnS, ZnSe/ZnS, CdTe/CdS. There are quantum dots based on Lanthanide particles. Quantum dots of Silicon, InGaN and InP/ZnS are also finding applications. Sometimes quantum dots are surrounded by two shells. There are quantum dots surrounded by organic shell as well as inorganic shell. Toluene is used as solvent for coating the quantum dots. The quantum yield stated in Table I is for illustration purpose only. However the quantum yield has been improved recently to 85%. The spectrum emitted by the material NanoDot 480 under ultra-violet excitation is shown in FIG. 05. It shows the UV absorption spectrum 51. The emission spectrum 52 is sharp without wide band and the full width at half maximum is around 35 nm with the peak emission wavelength of 475 nm. Latest developments on quantum dots give still sharper spectrum with FWHM of less than 25 nm. FIG. 05 shows the spectrum emitted by NanoDot 480 is symmetrical without side lobes and is a better spectrum compared to the blue spectrum emitted by blue phosphor as shown in FIG. 02. Recently there are quantum dots free from Cadmium.

Figure 6:
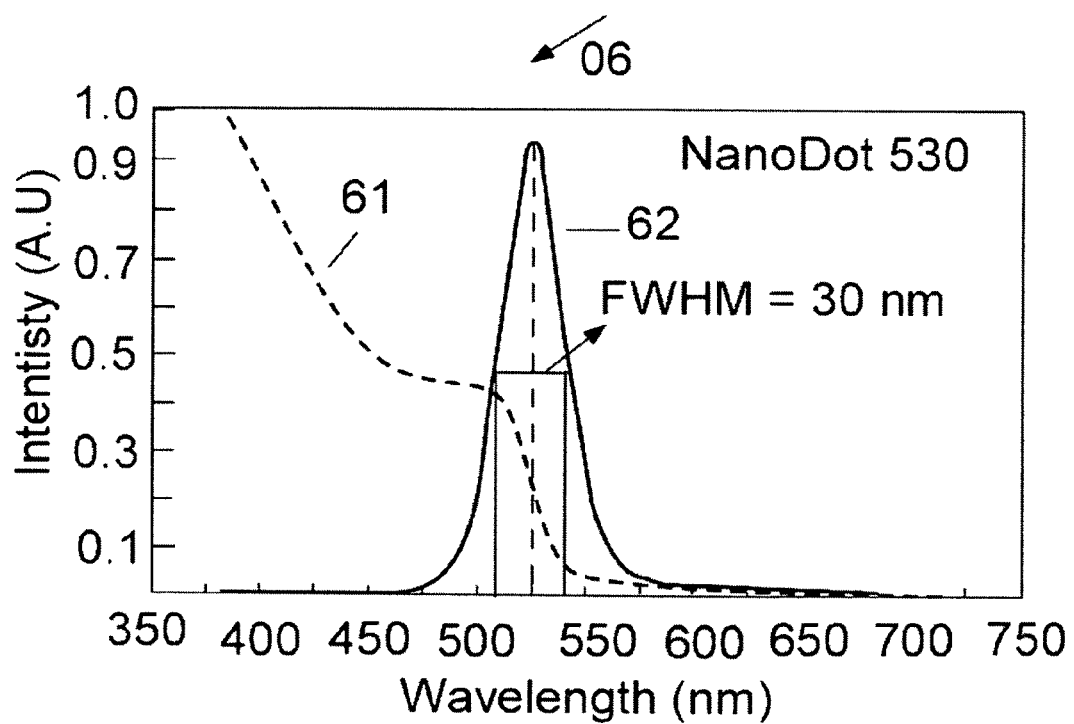
FIG. 06 shows the spectrum of green light emitted by quantum dots with brand name NanoDot 530.

FIG. 06 shows the spectrum of green light emitted by quantum dot (NanoDot 530 of Sigma-Aldrich). The specification of NanoDot 530 is shown in Table II.

TABLE II

Specification of quantum dot NanoDot 530

| Colour | Green |
|---|---|
| Type | CdSe—ZnS |
| Absorption max (+/−5 nm) | 515 |
| Emission max (+/−5 nm) | 530 |
| FWHM (nm) | <40 |
| Solvent | Toluene |
| Quantum Yield | 30-50% |
| Particle Size (nm) | 3.3 |

As per the Table II, the green light emitting quantum dot called NanoDot 530, supplied by the company Sigma-Aldrich, has a diameter of 3.3 nm and has a core material of CdSe with the shell material as ZnS. Every quantum dot is surrounded by a shell to prevent agglomeration of quantum dots and oxidation of the core material. Sometimes quantum dots are surrounded by two shells. There are quantum dots surrounded by organic shell as well as inorganic shell. Toluene is used as solvent for coating the quantum dots. The quantum yield stated in Table II is for illustration purpose only. However the quantum yield has been improved recently to 85%. The spectrum emitted by the material NanoDot 530 under ultra-violet excitation is shown in FIG. 06. It shows the UV absorption spectrum 61. The emission spectrum 62 is sharp without wide band and the full width at half maximum is around 30 nm with the peak emission wavelength of around 525 nm. Latest developments on quantum dots give still sharper spectrum with FWHM of less than 25 nm.

Figure 7:
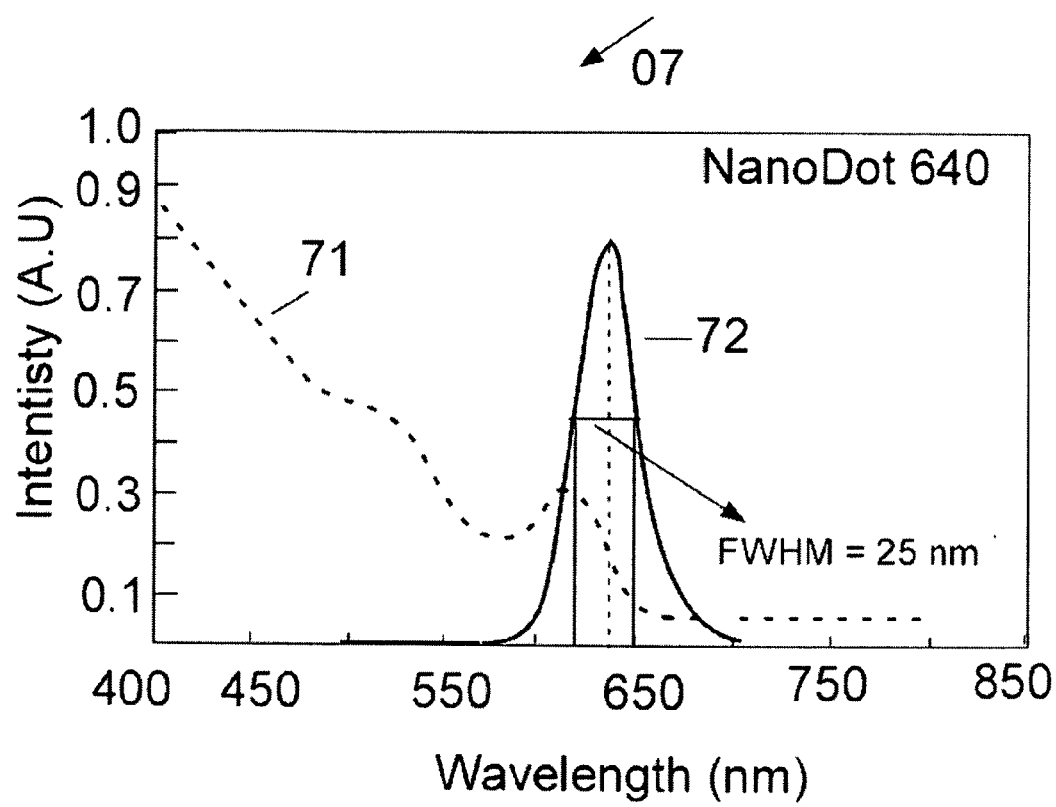
FIG. 07 shows the spectrum of red light emitted by quantum dots with brand name NanoDot 640.

FIG. 07 shows the spectrum of red light emitted by quantum dot (NanoDot 640 of Sigma-Aldrich). The specification of NanoDot 640 is shown in Table III.

TABLE III

Specification of quantum dot NanoDot 640.

| Colour | Deep Red |
|---|---|
| Type | CdSe—ZnS |
| Absorption max (+/−5 nm) | 610 |
| Emission max (+/−5 nm) | 640 |
| FWHM (nm) | <60 |
| Solvent | Toluene |
| Quantum Yield | 30-50% |
| Particle Size (nm) | 6.3 |

As per the Table III, the red light emitting quantum dot called NanoDot 640, supplied by the company Sigma-Aldrich, has a diameter of 6.3 nm and has a core material of CdSe with the shell material as ZnS. Every quantum dot is surrounded by a shell to prevent agglomeration of quantum dots and oxidation of the core material. Sometimes quantum dots are surrounded by two shells. There are quantum dots surrounded by organic shell as well as inorganic shell. Toluene is used as solvent for coating the quantum dots. The quantum yield stated in Table III is for illustration purpose only. However the quantum yield has been improved recently to 85%. The spectrum emitted by the material NanoDot 640 under ultra-violet excitation is shown in FIG. 07. It shows the UV absorption spectrum 71. The emission spectrum 72 is sharp without wide band and the full width at half maximum is around 25 nm with the peak emission wavelength of around 640 nm. Latest developments on quantum dots give still sharper spectrum with FWHM of less than 25 nm.

Figure 8A:
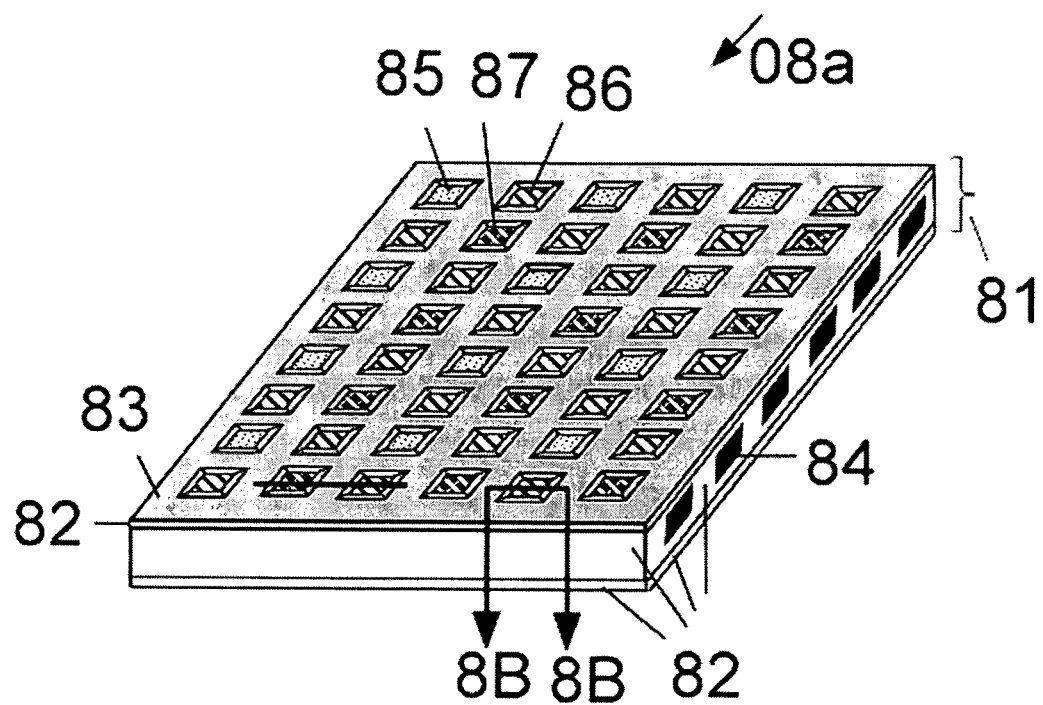
FIG. 08a shows the isometric view of UV/NUV based color pixel backlight employing quantum dot for light emission.

FIG. 08a shows the isometric view of the UV/NUV based color pixel backlight employing quantum dots for light emission, according to the present invention. This illustration is for the edge-lit configuration. The light guide in this configuration is made of either borosilicate glass or quartz glass or Acrylic or plexi-glass or any plastic material that has approximately 90% transmission for UV and NUV radiation and does not degrade after prolonged exposure to NUV radiation. The backlight 81 with its rectangular light guide (not seen in FIG. 08a because of all the coatings on its surface) has all its edges coated with UV and NUV reflector 82 except for the area occupied by the NUV LEDs 84. In all the description that follows, if the LEDs employed emit NUV rays, then the excitation of quantum dots is by NUV rays and if the LEDs emit UV rays the excitation of the quantum dots is by UV rays. However the components employed in the backlight assembly are compatible both for UV and NUV rays with respect to reflection, if the component employed in the backlight assembly is for the purpose of reflection and are compatible both for UV and NUV rays with respect to transmission, if the component employed in the assembly is for the purpose of transmission. The reflector 82 is also a reflector of visible light. Although the description here is mainly on NUV LEDs assembled in the structure shown in FIG. 08a, a combination of UV and NUV LEDs can also be employed. In the illustration, only one edge of the light guide is assembled with NUV LEDs but they can be assembled on all four edges if need arises for increasing the light output. The packaging of NUV LEDs is such that no NUV comes out of flat package and the NUV is injected into the rectangular light guide. The bottom surface of the light guide is also coated with the UV/NUV reflector 82 as shown. The UV/NUV reflector can be made of Aluminum film which is also a reflector of visible rays. The top surface of the light guide is coated with the reflector 82 over all areas except the pixelated sites 85, 86 and 87. The site 86 is for green light emission, 87 is for blue light emission and 85 is for red light emission. The pixelated sites can have sizes of squares with each side in the range of 25 microns to 150 microns. Besides square geometry there can be other geometries as well. Over the reflector 82 on the top surface of the light guide is coated a black layer 83 that can be made of black resin containing black Titanium pigments or dry film black resist. A blanket layer of the reflector 82 is coated first on the flat top surface of the light guide, before the pixel sites are formed, followed by the blanket coating of black layer. The pixel sites are formed through photo-lithographic etching or sandblasting. After the etching or sandblasting of the sites, a very thin film of Aluminum to a thickness of less than 5 nm is vacuum evaporated selectively at the pixel sites so that the Aluminum film is not continuous and instead it has substantial porosities with island formation. The film need not be conductive. Another method of forming Al islands with thickness in the range of 100 nm to 500 nm is by vacuum evaporation of Al or sputtering of Al through a shadow mask. In the case of thick Al, the reflection will be over 90% for visible as well as NUV rays. After the Al film is formed, quantum dots that emit red upon excitation by NUV rays can be inkjet printed or screen printed or spin coated or stamped on the respective pixel sites. The spin coating is followed by lithography. A similar process is followed for the quantum dots that emit green and blue light upon excitation by UV or NUV rays. An alternate pattern of the format of quantum dot layer is the striped R-G-B format. Another method, but inefficient method, is to print the pixels on the top surface of the light guide without roughening the surface. This will also give the pixelated backlight but with less light output. The pixel sites shown in FIG. 08a have red quantum dot pixel 85, green quantum dot pixel 86 and blue quantum dot pixel 87. The sequential order of these pixels can also be changed. The detailed cross-section, taken along 8B-8B of the pixel in FIG. 8a, is better shown in FIG. 085b.

Figure 8B:
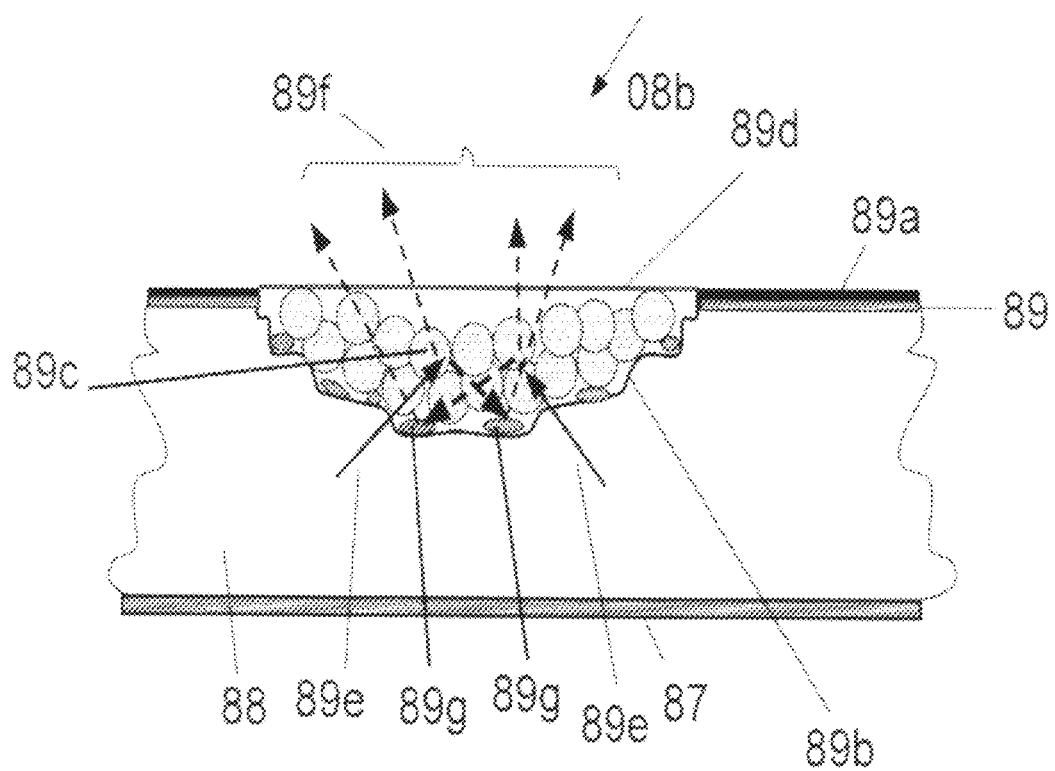

FIG. 08b shows the cross-sectional view of the section 8B-8B of FIG. 08a. The rectangular light guide 88 made of UV/NUV transparent material such as borosilicate glass or quartz of Acrylic or plexiglass or any other plastic material that has high transmission of more than 90% for UV/NUV rays, has UV/NUV and visible light ray reflector 87 at the bottom surface. The light guide 88 also has UV/NUV and visible light ray reflector 89 at the top surface in a pattern. The quantum dots 89c are covered by a protective layer 89d. At the top surface of the light guide the reflecting layer 89 has a black-layer 89a over it to enhance the contrast of LCD with the backlight assembled and operated in combination with LCD. Reflecting layer 89 and the black layer 89a prevent visible and NUV rays emerging between the pixels. The near ultra-violet rays injected into the light guide by the NUV LEDs (not shown in FIG. 08b) are extracted from the light guide as a result of the roughened surface 89b and the extracted NUV rays 89e impinge on the quantum dots 89c and excite them to emit visible light rays. The Illustration shows only one pixel, for example red pixel, containing red emitting quantum dots. These dots emit red light 89f. The same is true for other pixels. There is a thin Al layer underneath the quantum dot layers and the Al layer has plenty of porosity and is in the pattern of islands 89g. Thin Al islands give two advantages and one advantage is the suppression of color mixing between the pixels in a larger area of the backlight. The other advantage is the enhancement of visible light output from the pixels. This has been explained in a previously filed 'continuation in part' specification titled, "Suppression of color mixing in UV based color pixel backlight for liquid crystal display".

Figure 9:
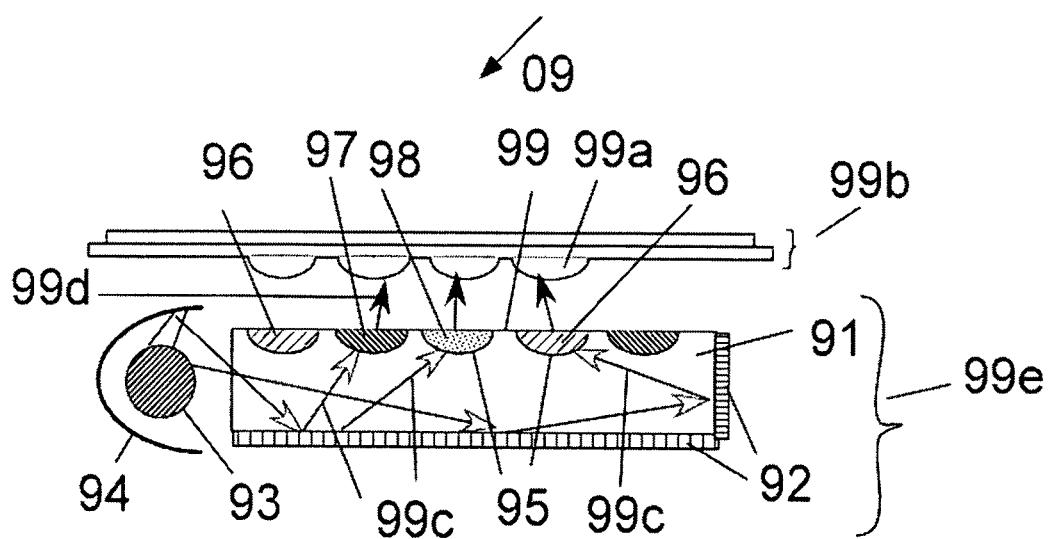

FIG. 09 shows the cross-sectional view of the structure, according to the present invention, assembled in edge-lit mode behind an LCD with a micro-lens sheet in between. The rectangular light guide 91 has NUV or UV LEDs 93 at one edge with a reflector 94 that is partially covering the NUV LED 93 except for the portion of NUV LED facing the light guide 91. The light guide 91 has reflectors 92 coated on all edges of the rectangular light guide 91 except on the edge facing the NUV LED 93 and the reflector 92 is also coated on the broader surface at the bottom portion of the light guide. The light guide has roughened concave portions 95 in the form of pixels. For the sake of simplicity the roughened profile is not shown in FIG. 09. These roughened pixels 95 contain quantum dots (not shown in FIG. 09) that can emit different colors of visible light upon excitation by UV or NUV rays. Depending on the color of emission of visible light by the quantum dots, the pixel is defined as the red pixel or blue pixel or green pixel. For example, 96 is the red pixel containing quantum dots that emit light of red color upon excitation by UV or NUV rays, 97 is the blue pixel containing quantum dots that emit light of blue color upon excitation by UV or NUV rays and 98 is green pixel containing quantum dots that emit light of green color upon excitation by UV or NUV rays. The quantum dots are covered by a moisture protecting layer 99. The near UV rays 99c, emerging after reflections at different surfaces of the light guide 91, are incident on different color pixels and thus excite the quantum dots contained in the pixels. As an example the excitation of quantum dots that emits light of blue color upon excitation by UV or NUV rays results in blue light emission 99d from the blue pixel. Similarly red and green color light emissions are produced when the NUV or UV rays are incident on the green and red pixels.

The whole light guide assembly 99e, the micro-lens sheet 99a, also called 'lenticular' sheet, and the LCD 99b are kept in alignment such that different colors of light emitted by the pixels are collimated by the micro-lens sheet 99a into the designated pixels of the LCD 99b. Light emitted by red pixel is collimated to the designated pixel of LCD that will display red pixel. Light emitted by blue pixel is collimated to the designated pixel of LCD that will display blue pixel. Light emitted by green pixel is collimated to the designated pixel of LCD that will display green pixel. Thus a color pixelated backlight is provided for the LCD that does not require color filters.

FIG. 09 is for the edge-lit configuration. A similar structure of pixels with quantum dots can be employed in 'direct-lit' configuration.

Figure 10:
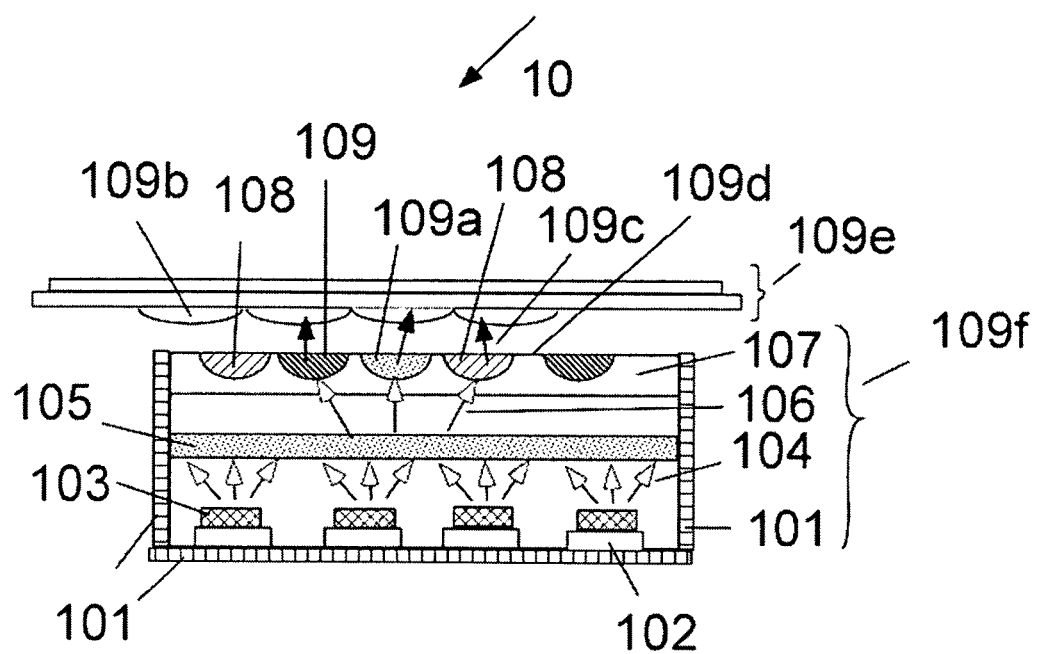

FIG. 10 shows the cross-sectional view of one embodiment of the present invention employed in an assembly of direct-lit mode of backlight for LCD with a micro-lens sheet in between the LCD and the backlight assembly. The direct-lit backlight box 109f comprises all the five inside surfaces coated with UV reflecting coatings 101 of material such as Al. NUV LEDs 103 with its heat sink 102 are assembled and powered to emit NUV rays 104. These rays pass through an UV/NUV diffuser plate 105 and emerge from the diffuser plate uniformly as rays 106 and excites the red pixel 108 that contains quantum dots (not shown in FIG. 10) that emits light of red color upon excitation by UV/NUV rays, blue pixel 109 that contains quantum dots (not shown in FIG. 10) that emits light of blue color upon excitation by UV/NUV rays and green pixel 109a that contains quantum dots (not shown in FIG. 10) that emits light of red color upon excitation by UV/NUV rays. These pixelated quantum dots are coated in roughened sites of the UV/NUV transmitting plate 107. For the sake of simplicity, the profile of the roughened surface is not shown in FIG. 10. The visible rays emerging from the pixel of quantum dots, for example light ray 109c coming out of the red pixel is incident on the micro-lens sheet 109b. Similar process takes place for blue and green pixelated sites. The backlight assembly 109f, the micro-lens sheet 109b, also called lenticular sheet, and the LCD 109e are kept in alignment, such that the different colors of light emitted by the pixels are collimated by the micro-lens sheet 109b into the designated pixels of the LCD 109e. Light emitted by red pixel is collimated to the designated pixel of LCD that will display red pixel. Light emitted by blue pixel is collimated to the designated pixel of LCD that will display blue pixel. Light emitted by green pixel is collimated to the designated pixel of LCD that will display green pixel. Thus a color pixelated backlight is provided for the LCD that does not require color filters.

Figure 11:
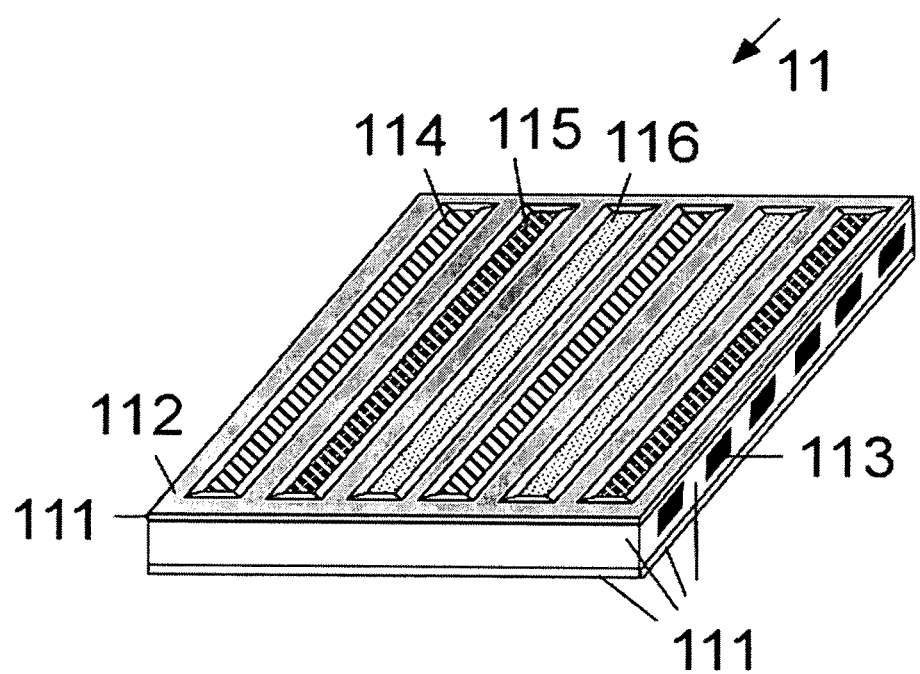
FIG. 11 is the isometric view of the color striped backlight, according to the present invention in edge-lit configuration.

FIG. 11 shows the isometric view of the NUV/UV based color pixel backlight employing quantum dots according to one embodiment of the present invention. The rectangular light guide shown in FIG. 11 is made of UV and NUV transmitting materials such as borosilicate glass or quartz glass or plexiglass or Acrylic or any other plastic material that transmit NUV and UV rays with a transmission of 90% and above. The plastic materials do not degrade after sufficient exposure to NUV or UV rays for prolonged period of time of 10,000 hours and more. The light guide is coated with UV/NUV reflector 111, such as Al, on all three edges and the bottom surface. At the edge where the NUV LEDs 113 are assembled, the reflector is coated on areas not occupied by the LEDs 113. The package of NUV LEDs is such the NUV rays emitted by the LEDs are injected into the light guide and is completely shielded from all other sides. Although the description here is for NUV LEDs, UV LEDs or a combination of UV and NUV LEDs can also be employed in the assembly shown in FIG. 11 or FIG. 09 or FIG. 10 or FIG. 08a. The top surface of the light guide is coated with reflector 111 and a black layer 112 is coated over the reflector 111. The layers 111 and 112 are coated every where except in the areas occupied by the stripes 114, 115, and 116. The stripe 114 contains red light emitting quantum dots coated by ink-jet printing or stamping or screen printing or spinning. The stripe 115 contains blue light emitting quantum dots coated through similar process as red emitting quantum dots. The stripe 116 contains green light emitting quantum dots coated through similar process for red emitting quantum dots. The sequence of the stripes can be changed. A white light emitting stripe can also be added. The structure shown in FIG. 11 can be assembled in an edge-lit configuration as shown in FIG. 09 and in 'direct-lit' configuration as shown in FIG. 10.

It will be understood that one skilled in the art could modify the above basic design, geometries, sequence of assemblies, materials, processes and components. Various modifications and variations can be made in the construction, configuration, applications and/or operation of the present invention without departing from the scope or spirit of the invention. By way of examples, (i) the description of quantum dots in the illustrations is generally about red, blue and green light emitting quantum dots but the material and size of the quantum dots can be changed to obtain narrow spectrum with desired chromaticity coordinates as well as quantum dots that emit white light can be incorporated in a white pixel along with red, blue and green pixel (ii) the NUV LEDs described are those whose peak wavelength is in the neighborhood of 360 nm but this can be altered to have peak wavelength less than 360 nm and more than 360 nm (iii) UV LEDs instead of NUV LEDs can be employed or a combination of NUV and UV LEDs can be employed (iv) the backlight box in 'direct-lit' configuration shows the UV and NUV reflectors, UV and NUV diffusers and heat sink but this can be modified to include many additional UV or NUV optical elements to obtain more uniform UV or NUV rays that can excite the quantum dots to obtain uniform colored visible light (v) the light guide structures described are provided with basic reflectors but this can be modified to have reflector patterns and multi-layer coatings of reflectors made of metallic and dielectric films (vi) the coupling element described to couple light from quantum dots to LCD with good alignment is a sheet of micro-lens but this can be modified to include other optical elements such as prism sheet (vii) the light guide described with one edge assembled with UV or NUV LEDs but this can be modified to have NUV LEDs assembled on two edges or three edges or four edges of light guide (viii) for suppressing the color mixing Al islands are employed in this invention. This could be modified to incorporate any reflecting film out of metallic or non-metallic materials, including multi-layer dielectric film with substantial reflectivity and controlled porosities. The Al islands are formed in this invention with random orientation but this could be modified to have fixed space between the islands. The space between the islands and the thickness of Al layer can be optimized to allow more UV or NUV flux to pass through and at the same time suppress visible light to escape sideward or downward from the pixel site in addition to blocking the visible light from adjacent pixels to enter the site. The present inventions describes the roughened surface through etching or sand-blasting and then coating a porous thin Al islands over which is coated layer of quantum dots. One can avoid the roughening of the surface and coat the Al islands followed by layer of quantum dots. This will still yield color pixilated backlight with lower efficiency but can simplify the process. The present invention is based on the UV or NUV emitting LEDs injecting UV or NUV rays into the light guide. One can also employ blue LEDs which emit radiation in the blue region with a peak wavelength of 450 nm and still obtain color pixel backlight with the foregoing description. Thus it is intended that the present invention covers the modifications and variations of the invention provided they come within the scope of the appended claims and their equivalents.

We claim:

1. A novel LED based color-pixel backlight system, providing increased color gamut for color filter-less Liquid Crystal Display, comprising:
   a light guide, having four edges and two broad surfaces, with at least one edge transmitting UV or NUV rays and assembled with multiplicity of UV or NUV emitting LEDs and the other edges, opposite to and adjacent to the transmitting edge, coated with reflector, reflecting UV, NUV and visible rays, with its bottom surface coated with UV, NUV and visible light reflecting mirror and its top surface roughened to create pixelated patterns for extracting UV or NUV light from the light guide;
   said light guide having its top surface coated with two layers one over the other, comprising a reflective layer at the bottom and a black layer at the top;
   said two layers being coated everywhere except in the pixelated areas;
   means for connecting UV or NUV LEDs to electrical power to emit UV or NUV radiation;
   said pixelated patterns containing multiplicity of reflective islands with a coating of quantum dots on top of the reflective islands and in between the reflective islands, and the layers of quantum dots having a protective coating on their surfaces opposite to the inner surface of the reflective islands;
   said reflective islands reflecting the visible light generated by the quantum dots within the pixel and suppressing the visible light entering the pixel from adjacent pixels through single or multiple reflections on the surface of the said light guide;
   said reflective islands having sufficient space between them allowing sufficient UV or NUV rays entering the pixelated region;
   said layers of quantum dots forming red, blue and green light emitting pixels that convert the UV or NUV rays incident on them into visible red, blue and green colors of light, with pixel patterns, that travel upward towards a sheet of micro-lens;
   said sheet of micro-lens, said pixelated pattern containing quantum dots on the surface of the light guide and the color filter-less LCD, are all assembled such that the said sheet of micro-lens, said formed pattern on the surface of the light guide and the LCD are kept substantially in alignment to provide color pixel backlighting to the said color filter-less LCD.

2. A novel LED based color-pixel backlight system for color filter-less Liquid Crystal Display, as in claim 1 wherein the said light guide is made of UV and NUV transmitting quartz glass or borosilicate glass or plexi glass or Acrylic or any plastic material that has a transmission of at least 50% for UV and NUV radiation.

3. A novel LED based color-pixel backlight system for color filter-less Liquid Crystal Display, as in claim 1 wherein the said reflective islands are made of metallic or non-metallic reflecting materials and have thickness in the range of 1 nm to 1000 nm.

4. A novel LED based color-pixel backlight system for color filter-less Liquid Crystal Display, as in claim 3 wherein the reflective islands are created by photo-lithographic process or vacuum evaporation process or plating process or sputtering process using shadow mask.

5. A novel LED based color-pixel backlight system for color filter-less Liquid Crystal Display, as in claim 1 wherein the said reflective islands are made of reflective dielectric layers that are reflective for visible light and transmissive for UV and NUV rays.

6. A novel LED based color-pixel backlight system for color filter-less Liquid Crystal Display, as in claim 1 wherein the said layers of quantum dots emit sharp spectrum in red light, blue light and green light with half width at full maximum of less than 30 nm.

7. A novel LED based color-pixel backlight system for color filter-less Liquid Crystal Display, as in claim 6 wherein the said layers of quantum dots contain materials of the quantum dots made of cadmium based materials such as CdSe, CdTe or cadmium-free materials such as Silicon or InGaN or InP or lanthanum based materials or oxide based phosphor particles with doping of rare-earth materials.

8. A novel LED based color-pixel backlight system for color filter-less Liquid Crystal Display, as in claim 6 wherein each quantum dot has primary and secondary shells around them and the shells are made of organic or inorganic materials.

9. A novel LED based color-pixel backlight system for color filter-less Liquid Crystal Display, as in claim 6 wherein the said layers of quantum dots have particles sizes in the range of 1 nm to 100 nm.

10. A novel LED based color pixel backlight system, as claimed in claim 1 wherein the LEDs are blue light emitting LEDs.

11. A novel LED based color-pixel backlight system for color filter-less Liquid Crystal Display, as in claim 1 wherein the said pixelated patterns on the said light guide are in the form of squares or rectangles or triangles or stripes or stars or polygons.

12. A novel LED based color-pixel backlight system, providing increased color gamut for color filter-less Liquid Crystal Display, comprising:
   a light guide, having four edges and two broad surfaces, with as many as four edges transmitting UV or NUV rays and assembled with multiplicity of UV or NUV emitting LEDs with its bottom surface coated with UV, NUV and visible light reflecting mirror and its top surface roughened to create pixelated patterns for extracting UV or NUV light from the light guide;
   said light guide having its top surface coated with two layers one over the other, comprising a reflective layer at the bottom and a black layer at the top of the reflective layer;
   said two layers being coated everywhere except in the pixelated areas;
   means for connecting UV or NUV LEDs to electrical power to emit UV or NUV radiation;
   said pixelated patterns containing reflective islands with a coating of layers of quantum dots on top of the reflective islands and in between reflective islands and the layers of quantum dots having a protective coating on their surfaces opposite to the inner surface of the reflective islands;
   said reflective islands reflecting the visible light generated within the pixel and suppressing the visible light entering the pixel from adjacent pixels through single or multiple reflections on the surface of the said light guide;
   said reflective islands having sufficient space between them allowing sufficient UV or NUV rays entering the pixel;
   said layers of quantum dots forming red, blue and green light emitting pixels that convert the UV or NUV rays incident on them into visible red, blue and green colors of light that travels upward towards a sheet of micro-lens;
   said sheet of micro-lens, said pattern containing quantum dots on the surface of the light guide and the color filter-less LCD, are all assembled such that the said sheet of micro-lens, said pattern on the surface of the light guide and the LCD are kept substantially in alignment to provide color pixel backlighting to the said color filter-less LCD.

13. A novel LED based color-pixel backlight system for color filter-less Liquid Crystal Display as in claim 12 wherein the said light guide has three edges transmitting UV and NUV rays and assembled with UV or NUV LEDs and the remaining edge is coated with UV and NUV reflecting mirrors.

14. A novel LED based color-pixel backlight system for color filter-less Liquid Crystal Display as in claim 12 wherein the said light guide has two edges, transmitting UV and NUV rays, assembled with UV or NUV LEDs and the remaining edges are coated with UV and NUV reflecting mirrors.

15. A novel LED based color-pixel backlight system, for providing increased color gamut for color filter-less Liquid Crystal Display, comprising:
   a backlight box having at least five internal surfaces with all the five internal surfaces being provided with UV and NUV reflectors with bottom surface containing multiplicity of UV or NUV emitting LEDs packaged to heat dissipating structures;
   means for connecting UV or NUV LEDs to electrical power to emit UV or NUV radiation;
   said backlight box containing a UV and NUV diffuser plate, spaced above the said UV or NUV LEDs, diffusively and uniformly transmitting UV or NUV rays towards a UV and NUV transmitting light guide plate;
   said UV and NUV transmitting light guide plate having its top surface roughened to create pixelated patterns for extracting UV or NUV rays and the remaining areas on the top surface coated with UV and NUV reflecting layer on top of which is coated a black layer;
   said pixelated patterns containing reflective islands with a coating of layers of quantum dots on top of the reflective islands and in between reflective islands and the layers of quantum dots having a protective coating on their surfaces opposite to the inner surface of the reflective islands;
   said reflective islands reflecting the visible light generated within the pixel and suppressing the visible light entering the pixel from adjacent pixels through single or multiple reflections on the surface of the said light guide;
   said reflective islands having sufficient space between them allowing sufficient UV or NUV rays entering the pixel;
   said layers of quantum dots forming red, blue and green light emitting pixels that convert the UV or NUV rays incident on them into visible red, blue and green colors of light that travels upward towards a sheet of micro-lens;
   said sheet of micro-lens, said pixelated pattern containing quantum dots on the surface of the light guide and the color filter-less LCD, are all assembled such that the said sheet of micro-lens, said formed pattern on the surface of the light guide and the LCD are kept substantially in alignment to provide color pixel backlighting to the said color filter-less LCD.

16. A novel LED based color-pixel backlight system for color filter-less Liquid Crystal Display, as in claim 15 wherein the said UV and NUV transmitting light guide plate is made of UV and NUV transmitting quartz glass or borosilicate glass or fused silica or plexi glass or acrylic with substantial transmission of at least 50% in UV and NUV wavelengths.

17. A novel LED based color-pixel backlight system for color filter-less Liquid Crystal Display, as in claim 15 wherein the said reflective islands are made of metallic or non-metallic reflecting materials and have thickness in the range of 1 nm to 1000 nm.

18. A novel LED based color-pixel backlight system for color filter-less Liquid Crystal Display, as in claim 17 wherein the reflective islands are created by photo-lithographic process or vacuum evaporation process or plating process or sputtering process using shadow mask.

19. A novel LED based color-pixel backlight system for color filter-less Liquid Crystal Display, as in claim 17 wherein the said reflective islands are made of reflective dielectric layers that are reflective for visible light and tansmissive for UV and NUV rays.

20. A novel LED based color-pixel backlight system for color filter-less Liquid Crystal Display, as in claim 15 wherein the said layers of quantum dots emit sharp spectrum in red light, blue light and green light with half width at full maximum of less than 30 nm.

21. A novel LED based color-pixel backlight system for color filter-less Liquid Crystal Display, as in claim 15 wherein the said pixelated patterns on the said light guide are in the form of squares or rectangles or triangles or stripes or stars or polygons.

22. A novel LED based color pixel backlight system, as claimed in claim 15 wherein the LEDs are blue light emitting LEDs.

\* \* \* \* \*